United States Patent [19]

Balram et al.

[11] Patent Number: 5,689,591
[45] Date of Patent: Nov. 18, 1997

[54] APPARATUS AND METHOD FOR NONCAUSAL, PREDICTIVE, DIGITAL IMAGE COMPRESSION

[75] Inventors: Nikhil Balram, Boca Raton, Fla.; José M. F. Moura, Pittsburgh, Pa.

[73] Assignee: Carnegie Mellon University, Pittsburgh, Pa.

[21] Appl. No.: 854,200

[22] Filed: Mar. 20, 1992

[51] Int. Cl.$^6$ ...................................................... H04N 1/00
[52] U.S. Cl. ........................ 382/276; 382/260; 382/265; 358/432; 358/433
[58] Field of Search ................ 382/56, 260, 265, 382/276; 358/430, 432, 433, 261.2, 133, 426

[56] References Cited

U.S. PATENT DOCUMENTS 5,001,560 3/1991 Ericsson .................................. 358/133

OTHER PUBLICATIONS

Balram, Moura, "Recursive Enhancement of Noncausal Images", 1991, pp. 2997–3000.
A. Habibi. Two–dimensional BAyesian Estimate of Images. In Proc. of IEEE, vol. 60, pp. 878–833, 1972.
J W. Woods, Two–dimensional Discrete Markovian Fields, IEEE TRans. Inform. Theory, IT–18:232–240, 1972.
JoseM. F. Moura and Nikhil Balram. A Recuisive Framework for Noncausal Gauss Markov Random Fileds. In 24th Annual Conf. Inform. Sci. Syst. pp.608–613, Priceton, NY Mar. 1990.
K. Abend, T. J. Harley and L. N. Kanal, Classification of Binary Random Patterns, IEEE Trans. Inform. Theory. IT–11:583–544, 1965.
D. K. Pickard A Curious Binary Lattice J. Appl. Prob, 14:717–731 1977.
J. K. Goutsias, Mutually Compatible Gibbs Random Fields IEEE Trans. Inform. Theory. IT—35 (6):538–544, Nov. 1989.

*Primary Examiner*—Wellington Chin
*Assistant Examiner*—Jean B. Corrielus
*Attorney, Agent, or Firm*—Kirkpatrick & Lockhart LLP

[57] ABSTRACT

The present invention is directed to an apparatus and method for converting a noncausal, two dimensional signal representative of a digitized image into an equivalent data format that can be filtered by recursive filters. The first step is to estimate an optimal set of parameters by: generating data representative of a potential matrix which represents the signal for a given set of parameters; filtering the potential matrix to arrive at a statistically equivalent recursive data format; inputting white noise to the recursive data format to generate k samples of the signal; obtaining an average value for the correlation $\{\chi_r\}$; generating data representative of a gradient of a likelihood function; using that data to minimize the likelihood function; comparing the arrived at set of parameters to a previously arrived at set of parameters to determine whether the difference therebetween is within a desired tolerance; and repeating the previous steps until an optimal set of parameters is estimated. The next step is to generate data representative of a potential matrix using the optimal set of parameters. That potential matrix is filtered to arrive at a statistically equivalent recursive representation. The equivalent, recursive representation may be used, for example, for image compression or image smoothing.

13 Claims, 4 Drawing Sheets

APPARATUS AND METHOD FOR NONCAUSAL, PREDICTIVE, DIGITAL IMAGE COMPRESSION

BACKGROUND OF THE INVENTION

The invention herein described was made in the course of or under a contract, or a subcontract thereunder, with the Department of Defense.

1. Field of the Invention

The present invention is directed generally to two dimensional signal processing of data (e.g. image restoration, image smoothing, data compression, etc.) and more particularly to apparatus and methods for the compression of digital images.

2. Description of the Background

The digitization of images results in a tremendous amount of digital information. Consider an image constructed of a 512 by 512 matrix of pixels. Each pixel in the matrix must be digitized, which produces a string of digital information. Storing such massive amounts of data in a central data base in a manner which allows for on line retrieval is a tremendous task. Thus, the need arises for applying data compression techniques to the processing of two dimensional images.

Image coding or compression is a process in which the original image (usually digitized to a resolution of eight bits/pixel/color) is transformed to a more efficient representation in which, on average, fewer bits per pixel are required. The compression ratio achieved is the ratio between the bits per pixel of the original representation versus the bits per pixel of the new representation.

In one dimensional signal processing, Markov random processes are commonly assumed models. They capture the natural assumption of causality in time dependent signals and lead to recursive processing algorithms of the Kalman-Bucy type. When describing spatially dependent phenomena, as for example in mapping temperature or salinity fields in physical oceanography or in two dimensional image processing, noncausality is a more appropriate characteristic than causality.

In FIG. 1A, a causal model is illustrated while in FIG. 1B a noncausal model is illustrated. In FIGS. 1A and 1B, the pixels marked by "X" are the only pixels that affect the value of the pixel at "0". In causal models such as shown in FIG. 1A, the dependence is from one direction only. In contrast, in noncausal models such as shown in FIG. 1B, the dependence is from all directions. Thus, noncausal models are a much superior paradigm over causal models for representing image data.

The noncausal Markov property applied to two dimensional fields produces the noncausal Markov random field model. However, noncausality is conducive to iterative processing algorithms and not to recursive algorithms. Iterative processing theoretically requires solving a function or equation an infinite number of times and having to set subjective limits on when the solution is "good enough". Iterative processes are considered expensive from a computational point of view, i.e., requiring much computer time and resources. On the other hand, recursive techniques allow a definite result to be achieved in a much shorter period of time. Thus, to enable the use of recursive algorithms for two dimensional fields, those of ordinary skill in the art frequently enforce a causal type, two dimensional, Markov property. In the process, they compromise an important property (noncausality) of the model. Examples of such models include Markov Mesh Fields[1], Pickard random fields[2], mutually compatible Gibbs random fields[3], or unilateral recursive autoregressive fields[4]. Thus the need exists for an apparatus and method for allowing recursive two-dimensional signal processing, while retaining the noncausality property of the two-dimensional fields.

[1] K. Abend, T. J. Harley, and L. N. Kanal. Classification of Binary Random Patterns. *IEEE Trans Inform. Theory.* IT-11:538–544, 1965.
[2] D. K. Pickard. A Curious Binary Lattice. *J. Appl. Prob.*, 14:717–731, 1977.
[3] J. K. Goutsias. Mutually Compatible Gibbs Random Fields. *IEEE Trans. Inform. Theory.* IT—35(6):538–544, November 1989.
[4] A. Habibi. Two-dimensional Bayesian Estimate of Images. In *Proc. of IEEE*, volume 60, pages 878–883, 1972.

SUMMARY OF THE PRESENT INVENTION

In its broadest form, the present invention is directed to an apparatus and method for converting a noncausal, two dimensional signal or image expressed as a Gauss Markov random field (GMRF), into an equivalent recursive signal. The first step is to estimate an optimal set of parameters that fits a parsimonius model (i.e., a model with a small number of independent parameters) to the image. That step is accomplished by minimizing the likelihood function using a conjugate gradient method and includes the steps of: determining the potential matrix associated with the GMRF; transforming the potential matrix into an equivalent recursive representation through the Cholesky factorization of the potential matrix for a given set of parameters using the Riccati iteration; generating k samples of the field by inputting white noise to the equivalent recursive representation; obtaining an average value for the correlation $\{\chi_\tau\}$; solving the following equation to obtain the gradient, $$\nabla L = [\nabla L_\tau : \tau \in \eta_p] \text{ where}$$

$$\nabla L_\tau = \frac{E\{\chi_\tau\} - \chi_\tau}{\sigma^2} \text{ and}$$

$\hat{E}\{\chi_\tau\}$ is the average value of $\chi_\tau$;

using the gradient to minimize the likelihood function using a gradient based method, and repeating the previous steps until an optimal set of parameters is estimated. For special cases, we provide a simple optimal procedure as well as a shortcut or approximate procedure. The second step is to transform the potential matrix into an equivalent recursive representation through the Cholesky factorization of the potential matrix for the optimal set of parameters using the Riccati iteration.

The equivalent, recursive representation may be used, for example, in a coder to compress an image expressed as a GMRF by comparing the equivalent recursive representation for the optimal set of parameters to the GMRF to establish an error image. The error image and the optimal set of parameters are equivalent to the data expressed as the GMRF but require fewer bits than the digital image. The error image and the optimal set of parameters may then be transmitted or stored. A decoder is provided which performs the reverse function of the coder.

The present invention allows recursive techniques to be applied to a noncausal model without requiring that the noncausal characteristics of the model be compromised. Other advantages and benefits of the present invention will become apparent from a Detailed Description of a Preferred Embodiment hereinbelow.

BRIEF DESCRIPTION OF THE DRAWINGS

For the present invention to be easily understood and readily practiced, it will now be described, by way of example only, in conjunction with a preferred embodiment, wherein.

DESCRIPTION OF A PREFERRED EMBODIMENT

The present invention will be described in conjunction with a novel data compression method or coder 10, which also forms a part of the present invention. The reader will recognize, however, that the broadest aspects of the present invention, which are implemented in the coder 10, have other applications beyond the coder 10.

Figures 1A, 1B, 2, 3:
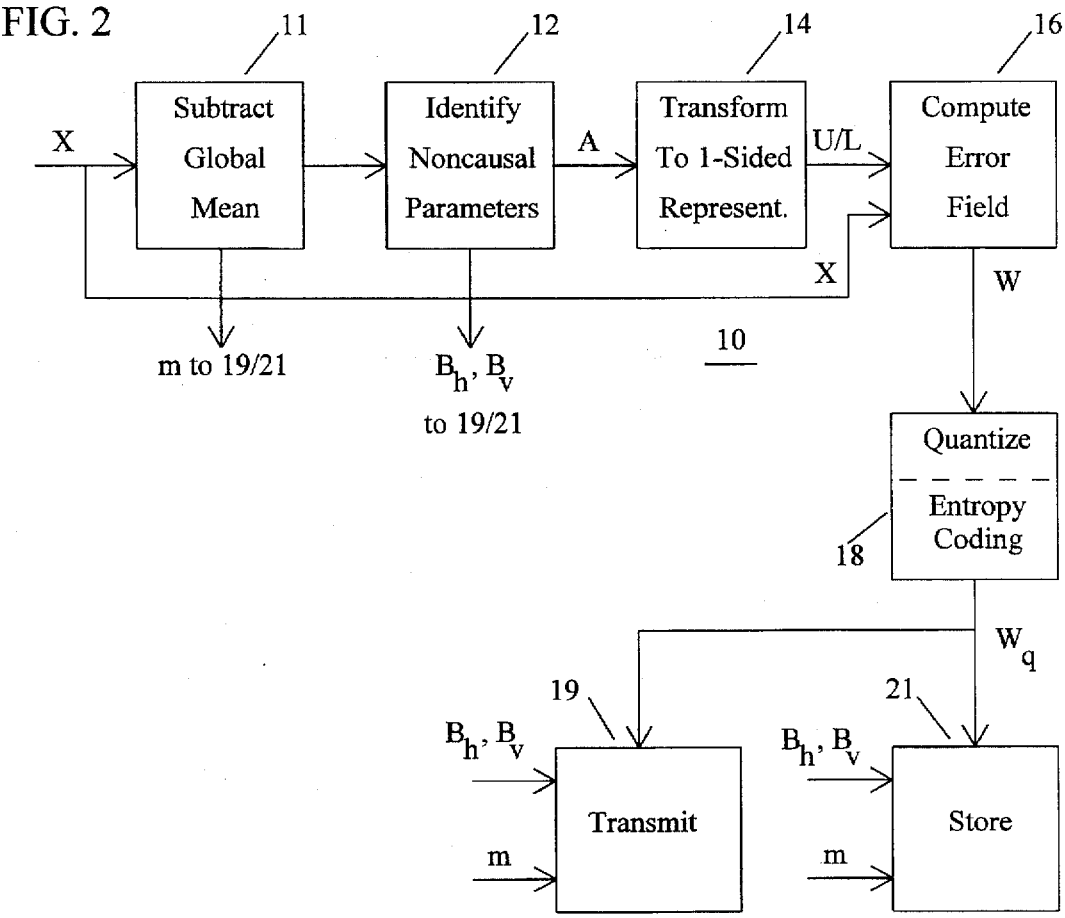
FIG. 1A illustrates a causal mode.
FIG. 1B illustrates a noncausal model.
FIG. 2 is a block diagram illustrating the steps of the image compression technique, or coder, of the present invention.
FIG. 3 illustrates the difference between first order and higher order systems.

The coder 10 has five stages illustrated in FIG. 2. The stages can be implemented by appropriate programming of a commercially available digital computer. The image X is represented as a noncausal Gauss Markov random field (GMRF). In a first stage 11, a global image mean is calculated and subtracted from the image X. In a second stage 12, the model parameters contained in the model matrix are estimated from the image X. The estimation of the model parameters is an important feature of the present invention and is discussed at length below. A last step of the second stage 12 is to calculate the inverse covariance matrix, which we call the potential matrix A, for the estimated model parameters. The potential matrix A is then input to the next stage 14, wherein that noncausal image model is transformed to a one-sided representation which is a more convenient, and equivalent, recursive form U/L.

In a fourth stage 16, the recursive representation U/L is used to recursively generate a statistical uncorrelated error field W for the given image X. In a last stage 18, the uncorrelated error field W is quantized and coded.

Using the notation in FIG. 2, the parameters of the noncausal model matrix A and the error image W are equivalent to the original image X. The error field has a considerably smaller dynamic range of values than the original image and thus requires less bits per pixel on average. It is therefore a more efficient representation. The choice of quantizer for quantization of the error image values is open to the user. In our experiments, we use a Vector Quantizer VQ, to obtain large compression ratios.[5] The quantized and coded error image $W_q$ and the noncausal model parameters may be transmitted, as shown at block 19, using any appropriate transmission means, to a decoder 20 of the type shown if FIG. 4. Alternatively, that information could be sent to a storage medium, as shown at 21, where it is held until the image is requested. After the image is requested, that information would be routed to the decoder 20.

[5] Y. Linde, A. Buzo, and R. M. Gray, An Algorithm for Vector Quantizer Design, IEEE Trans. Comm., COM-28:84–95, January 1980.

Figure 9:
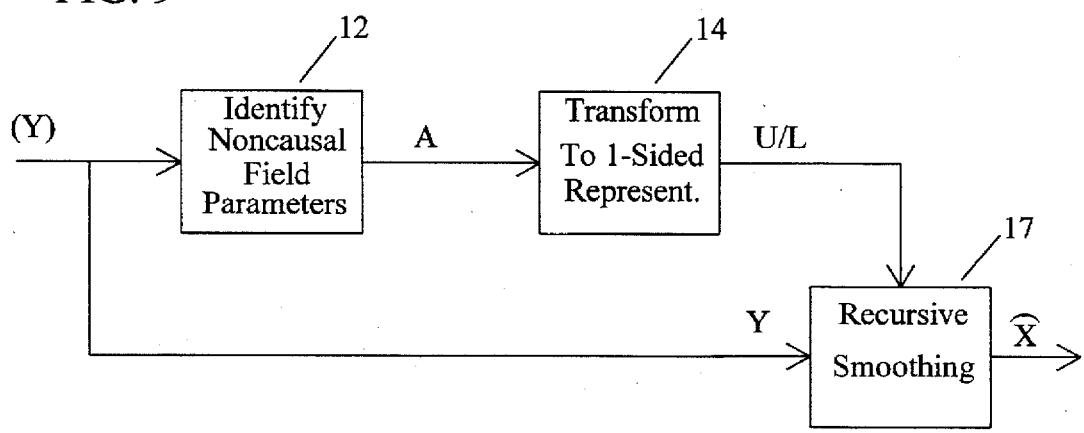
FIG. 9 is a block diagram illustrating the steps of an image smoothing technique using one aspect of the present invention.

It has been noted that although the broadest aspect of the present invention is described in conjunction with the unique decoder 10 of FIG. 1, other applications of the broadest aspect of the present invention are possible. For example, as shown in FIG. 9, after the noncausal field parameters of a noisy image Y have been estmated in stage 12, and the one-sided, recursive representation U/L is produced at stage 14, output U/L may be input to a subsequent processing stage 17 for application of known image restoration or image smoothing techniques to produce an enhanced or smoothed image.

1.0 Theoretical foundations

In the following section, we summarize the main theoretical results upon which our coder/decoder (codec) is based.

1.1. Notation

Briefly, the notation we use in this document is as follows. We assume the image X is defined on a N×M rectangular lattice L, i.e, $$X=\{\chi_{i,j}: (i,j) \in L\}. \tag{1}$$

For modeling and processing, we stack the image pixels into vectors using lexicographic ordering. Lexicographic ordering maps each row of the image into an M×1 vector and these are stacked one on top of the other to form the NM×1 vector, $$\vec{X}=[\vec{\chi}_1^T, \vec{\chi}_2^T, \ldots \vec{\chi}_N^T]^T \tag{2}$$

where $$\vec{\chi}_i=[\chi_{i1}, \chi_{i2}, \ldots, \chi_{iM}]^T. \tag{3}$$

1.2. Noncausal model

The image is modeled as a (zero mean) noncausal Gauss Markov random field. The autoregressive representation of this model has the form $$A\vec{X}=\vec{e}, \quad \vec{e} \sim N(\vec{0}, \sigma^2 A) \tag{4}$$

Where A is the inverse covariance matrix that has the form given below:

$$A = \begin{bmatrix} B & C & \underline{0} & . & . & . & . \\ C^T & B & C & \underline{0} & . & . & . \\ \underline{0} & C^T & B & C & \underline{0} & . & . \\ . & . & . & . & . & . & . \\ . & . & \underline{0} & C^T & B & C & \underline{0} \\ . & . & . & \underline{0} & C^T & B & C \\ . & . & . & . & \underline{0} & C^T & B \end{bmatrix} \tag{5}$$

where B and C are M×M sparse banded blocks whose structure depends on the order of the model. The above structure is for zero (or free) boundary conditions. Alternate boundary conditions cause small perturbations in the structure. Equation (4) is known as the minimum mean square error (MMSE) representation.[6]

[6] J. W. Woods, Two-dimensional Discrete Markovian Fields, IEEE Trans. Inform. Theory, IT-18:232–240, 1972.

The order of the noncausal model is determined by the number of neighboring pixels that the value of a particular pixel depends on. In FIG. 3, for example, in the first order or so-called nearest neighbor model, the value of each pixel depends on only the four nearest neighbors (North, South, West, East). The first order system is depicted by "1", the second order system is depicted by "2", etc. Higher order neighborhoods include these as well as additional neighbors. Noncausal neighborhoods up to the 6th order are shown in FIG. 3. For neighborhoods of order 3 or greater, repartitioning of the lattice is required to retain the block tridiagonal structure of A. For example, for a third order model, the lattice is repartitioned so that starting from the top two consecutive rows at a time are grouped together in each vector $\vec{\chi}_i$ in (3), i.e., for the repartitioned lattice, the row and column sizes become:

$$N := N/2, \qquad (6)$$

$$M := 2M. \qquad (7)$$

The potential matrix A contains the field interaction coefficients, represented compactly as a parameter vector $\theta$. For example, for a first order GMRF, $$\theta = [\beta_h, \beta_v]. \qquad (8)$$

Knowledge of the field order and the parameter vector provides complete information about the potential matrix and hence the model.

1.3 Recursive representations

The representation in equation (4) is nonrecursive and is therefore not conducive to the recursive processing required in predictive coding. However, there exist two recursive or one-sided representations, a "backward" and a "forward", each of which is statistically equivalent to the one in (4). The equivalent recursive or one-sided representations are obtained through the Cholesky factorization of the potential matrix.

$$A = U^T U \qquad (9)$$

where the upper triangular NM×NM Cholesky factor U has the following block structure:

$$U = \begin{bmatrix} U_1 & \Theta_1 & \underline{0} & . & . & . \\ 0 & U_2 & \Theta_2 & \underline{0} & . & . \\ . & . & . & . & . & . \\ . & . & . & . & . & . \\ . & . & \underline{0} & \underline{0} & U_{N-1} & \Theta_{N-1} \\ . & . & . & \underline{0} & \underline{0} & U_N \end{bmatrix} \qquad (10)$$

$$= I_N \otimes_i U_i + (K_N)^T \otimes_i \Theta_i,$$

where $U_i$ and $\Theta_i$ are M×M blocks, with the $U_i$'s being upper triangular. Note that the lattice may have been repartitioned (as discussed earlier), in which case N and M are the row and column sizes of the repartitioned image.

The "backward" and "forward" representations may be expressed as AR processes or in state space form, as given below.

"Backward" This can be expressed as an autoregressive (row) process:

$$U_N \vec{\chi}_N = \vec{\omega}_N, \; U_i \vec{\chi}_i + \Theta_i \vec{\chi}_{i+1} = \vec{\omega}_i, \; 1 \leq i \leq N-1 \qquad (11)$$

or as a state space (row) process:

$$\vec{\chi}_N = G_N^b \vec{\omega}_N, \; \vec{\chi}_i = F_i^b \vec{\chi}_{i+1} + G_i^b \vec{\omega}_i, \; 1 \leq i \leq N-1 \qquad (12)$$

with $\vec{\omega}_i \perp \vec{\chi}_j$ for $i < j$, and $$E(\vec{\omega}_i \vec{\omega}_j^T) = \sigma^2 I_M \delta_{i,j}, \; E(\vec{\omega}_i \vec{\omega}_i^T) = \sigma^2 U_i^{-1}, \qquad (13)$$

for $1 \leq i \leq N$, where $\delta_{i,j}$ is the Kronecker symbol. In other words, the driving noise, $\omega_{i,j}$ is white and uncorrelated with image variables that lie ahead of it in the lexicographic ordering.

"Forward" This can be expressed as an autoregressive (row) process:

$$L_N \vec{\chi}_1 = \vec{z}_1, \; L_{N-i+1} \vec{\chi}_i + P_{N-i+1} \vec{\chi}_{i-1} = \vec{z}_i, \; 2 \leq i \leq N, \qquad (14)$$

or a state space (row) process:

$$\vec{\chi}_1 = G_1^f \vec{z}_1, \; \vec{\chi}_i = F_i^f \vec{\chi}_{i-1} + G_i^f \vec{z}_i, \; 2 \leq i \leq N, \qquad (15)$$

with $\vec{z}_i \perp \vec{\chi}_j$ for $j < i$ and $$E(\vec{z}_i \vec{z}_j^T) = \sigma^2 I_M \delta_{i,j}, \; E(\vec{\chi}_i \vec{\chi}_i^T) = \sigma^2 L_{N-i+1}^{-1}, \qquad (16)$$

for $1 \leq i \leq N$.

The model matrices for the state space representations are, for the "backward", given by $$tiG_i^b = U_i^{-1}, \; +tm \qquad (17)$$

$$F_i^b = -U_i^{-1} \Theta_i = -G_i^b (G_i^b)^T C, \qquad (18)$$

and, for the "forward", given by $$G_i^f = JG_{N-i+1}^b J = JU_{N-i+1}^{-1} J, \; F_i^f = JF_{N-i+1}^b J = -G_i^f (G_i^f)^T C, \qquad (20)$$

The "forward" and "backward" representations are mirror images of one another, hence only one of them needs to be computed.

1.4 Riccati iteration

The set of matrices needed to specify either of the recursive representations, $\{U_i, \Theta_i\}$, is obtained from the Riccati type iteration.

$$S_i = B - C^T S_{i-1}^{-T} C, \qquad (21)$$

where $$S_i = U_i^T U_i, \qquad (22)$$

$$U_i^T \Theta_i = C. \qquad (23)$$

The initial and final conditions for the iteration are determined by the choice of boundary conditions.

Convergence: Define the quantity $$\zeta = 2 \|B^{-1}\|_s \|C\|_s, \qquad (24)$$

where $\|\cdot\|_s$ denotes the matrix spectral norm. Under the, constraint $$0 < \zeta, 1, \qquad (25)$$

and some constraints on the initial condition, the sequence $\{S_i\}$ converges, i.e., $$S_i \to S_\infty, \qquad (26)$$

where $S_\infty$ is a solution of the steady state equation $$S_\infty = B - C^T S_\infty^{-1} C. \qquad (27)$$

Furthermore, the rate of convergence is geometric, $$\|S_i - S_\infty\|_s \leq K_o \alpha^i, \; \forall_i \geq 2, \qquad (28)$$

where $$\alpha = \zeta^2 \quad (29)$$

$$K_0 = \frac{\|S_2 - S_\infty\|_s}{\zeta^4}, \quad (30)$$

$\zeta$ is defined by (24), and $$0 < \alpha < 1, \quad (31)$$

$$0 < K_0 \leq \frac{2\|B\|_s}{\zeta^4}. \quad (32)$$

Tighter bounds than (24) may be derived for first order and special second order models. See J. M. F. Moura and N. Balram, Recursive Structure of Noncausal Gauss Markov Random Fields, *IEEE Trans. Inform. Theory*, IT-38(2), March 1992, which is hereby incorporated by reference. From the point of view of computer interpretation, the geometric rate of convergence of the iteration is highly significant because it means that after a small number of steps $$n \ll N \quad (33)$$

it can be safely assumed that $$S_i = S_\infty, \quad i \geq n \quad (34)$$

and so $$U_i = U_\infty, \quad i \geq n \quad (35)$$

$$\Theta_i = \Theta_\infty, \quad i \geq n \quad (36)$$

where $U_\infty$ is the Cholesky factor of $S_\infty$ $$S_\infty = U_\infty^T U_\infty, \quad (37)$$

and $$U_\infty^T \Theta_\infty = C \quad (38)$$

2. Identify Noncausal Parameters.

The noncausal model parameters $\theta$ (a vector containing the interaction coefficients) and $\sigma^2$ have to be estimated from the given image. The optimal estimates are obtained by minimizing the (negative log) likelihood function $$L(X/\theta, \sigma^2) = \frac{1}{2} \ln \sigma^2 - \frac{1}{2NM} \ln|A_p(\theta)| + \frac{1}{2\sigma^2 NM} \vec{X}^T A_p(\theta) \vec{X}, \quad (39)$$

where $A_p$ is the potential matrix of a pth order model. The procedure for parameter estimation described herein has also been described by us in detail in N. Balram and J. M. F. Moura, Noncausal Gauss Markow random fields: Parameter Structure and Estimation, Technical Report 91-03, LASIP, ECE, Carnegie Mellon University, April 1991, which is hereby incorporated by reference. The function gradient is an important tool in an efficient search of the parameter space, therefore gradient based methods are usually preferred. We chose to use the conjugate gradient method. In the conjugate gradient method (or any other gradient based procedure) evaluation of the gradient $\nabla L(.)$ is required at several points in the search space. We have formulated a novel approach for computing $\nabla L$ for arbitrary order noncausal GMRF's which exploits the recursive structure of these models.

Arbitrary order models: The likelihood function for a path order GMRF (with neighborhood set $\eta_p$) is given by $$L(\theta, \sigma^2) = \quad (40)$$

$$\frac{1}{2} \ln \sigma^2 - \frac{1}{NM} \sum_i^N \ln|U_i| + \frac{1}{2\sigma^2} \left[ S_x - 2 \sum_{\tau \in \eta_p} \beta_\tau X_\tau \right],$$

where the $U_i$'s are the blocks on the diagonal of the Cholesky factor (10) and are computed using the Riccati iteration (21) and (22). The geometric convergence of the Riccati iteration significantly reduces the cost of computer evaluation of $L(.)$. $S_x$ is the sample power, $$S_x = \frac{1}{NM} \sum_{i=1}^N \sum_{j=1}^M x_{i,j}^2, \quad (41)$$

$X_\tau$ is the sample correlation of lag $\tau$, $$X_\tau = \begin{cases} \frac{1}{NM} \sum_{r=1}^{N-i} \sum_{s=1}^{M} x_{r,s} x_{r+i,s} & \text{for } \tau = v_i, \\ \frac{1}{NM} \sum_{r=1}^{N} \sum_{s=1}^{M-j} x_{r,s} x_{r,s+j} & \text{for } \tau = h_j, \\ \frac{1}{NM} \sum_{r=1}^{N-i} \sum_{s=1}^{M-j} x_{r,s} x_{r+i,s+j} & \text{for } \tau = ld_{ij}, \\ \frac{1}{NM} \sum_{r=1}^{N-i} \sum_{s=j+1}^{M} x_{r,s} x_{r+i,s-j} & \text{for } \tau = rd_{ij}, \end{cases} \quad (42)$$

and $\sigma^2$ is substituted from $$\sigma^2(\theta) = S_x - 2 \sum_{\tau \in \eta_p} \beta_\tau X_\tau. \quad (43)$$

The gradient is given by:

$$\nabla L = [\nabla L_\tau : \tau \in \eta_p], \quad (44)$$

where $$\nabla L_\tau = \frac{E\{X_\tau\} - X_\tau}{\sigma^2}, \quad \text{for each } \tau \in \eta_p. \quad (45)$$

We describe below a novel approach for computing the gradient that exploits the recursive structure of GMRF's.

Computation of the gradient: At any point $(\theta^{(i)}, \sigma^{2(i)})$ in the parameter space, a fast recursive synthesis procedure based on the recursive structure of noncausal GMRS's is used to generate a large number (K) of samples of a field with the parameters $(\theta^{(i)}, \sigma^{2(i)})$. The quantities $E\{\chi_\tau\}$ are estimated from those samples as $$\hat{E}\{X_\tau\} = \frac{1}{K} \sum_{k=1}^K X_\tau^{(k)}, \quad (46)$$

where $\chi_\tau^{(k)}$ is the correlation of lag $\tau$ computed from field sample #k. The procedure is summarized below.

Figure 10:
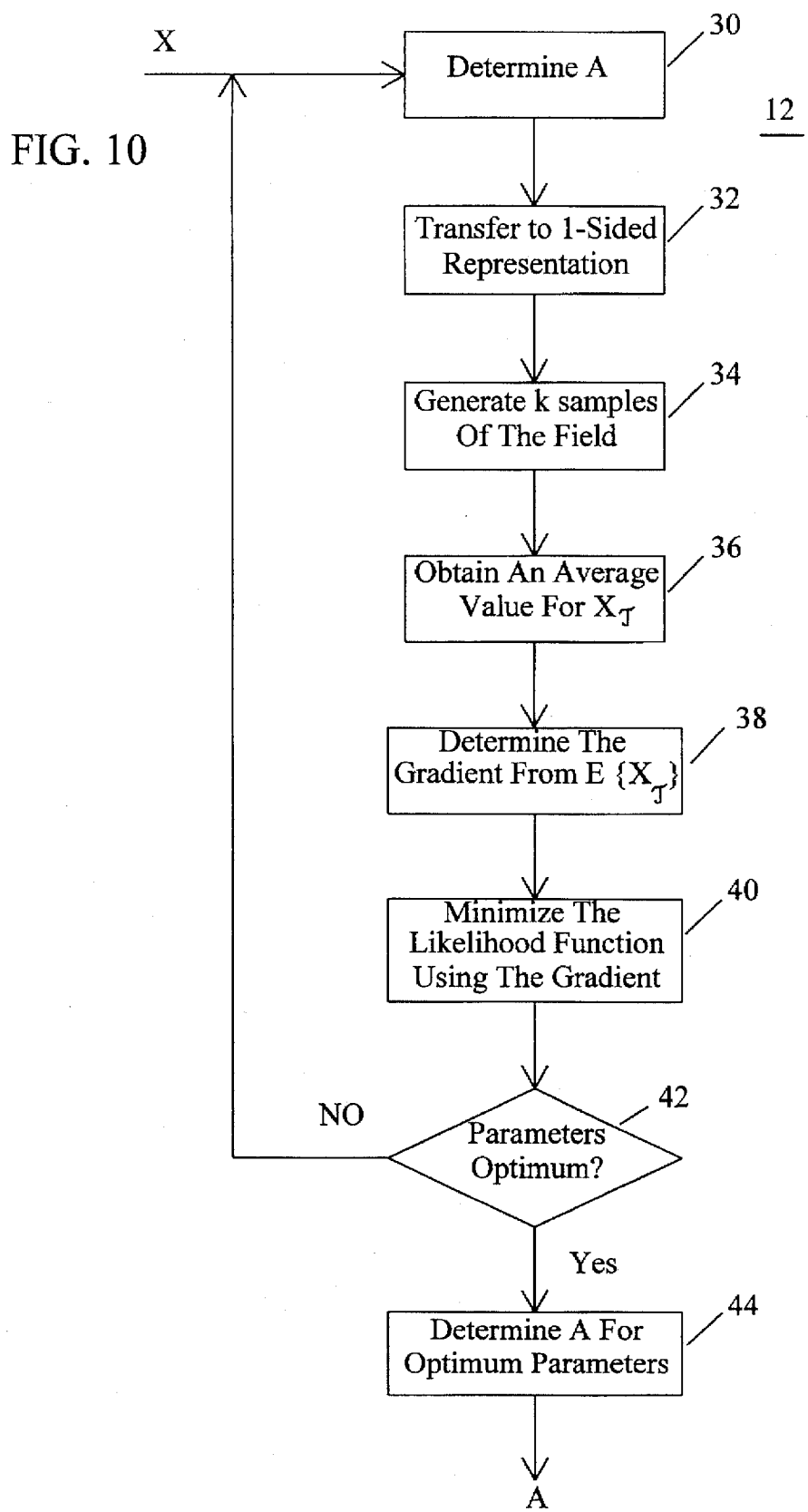
FIG. 10 is a block diagram illustrating the steps of the parameter estimation stage 12.

Turning to FIG. 10, in step 30, potential matrix $A_p(\theta^{(i)})$ is determined for a given set of parameters, which may be zero for the first iteration and the results of the previous iteration for subsequent iterations. In step 32, the Cholesky factor matrices $\{U_i, \Theta_i\}$ are computed using the Riccati iteration (21), (22), and (23). In step 34, using one of the state space representations, for example, the ("backward") state space representation (12), recursively generate K samples of the field, with a Gaussian random number generator providing the white noise input. For k=1 to K:

$$\vec{\chi}_N^{(k)} = G_N^b \vec{\omega}_N^{(k)}, \quad (47)$$

$$\vec{\chi}_i^{(k)} = F_i^b \vec{\chi}_{i+1}^{(k)} + G_i^b \vec{\omega}_i^{(k)}, \quad 1 \leq i \leq N-1, \quad (47)$$

with model matrices defined in (17) and (18). The sample correlation $X_\tau^{(k)}$ is computed for sample #k.

In step 36, the sample correlations $\{x_\tau^{(k)}\}_k^K=1$ are substituted into (46) to obtain an everage value, and in step 38 the results are substituted into (45) to obtain an estimate for the gradient at the given point. The estimate of the gradient is then used in step 40 to minimize the likelihood function. In step 42, if the parameters are not optimal, the process is repeated beginning with step 30 until optimal parameters are estimated. When the optimal parameters are estimated, the potential matrix A associated therewith is determined at step 44.

In some cases, particularly for first order fields, the function L(.) and its gradient can be parametrized explicitly in terms of the field parameters, thereby obviating the need for using the algorithm given above.

First order: First order GMRF's have only two interaction parameters, $\beta_h$ and $\beta_v$, representing, respectively, the horizontal and vertical nearest neighbor interactions, see FIG. 3. For these fields the likelihood function is given by $$L(X/\beta_h, \beta_v, \sigma^2) = \qquad (48)$$

$$\frac{1}{2}\ln\sigma^2 - \frac{1}{2NM}\sum_{i=1}^{N}\sum_{j=1}^{M}\ln(1-\beta_v\lambda_i(S_N)-\beta_h\lambda_j(S_M)) +$$

$$\frac{1}{2\sigma^2}[S_x - 2\beta_h\chi_h - 2\beta_v\chi_v],$$

where $S_\chi$ is the sample power defined in (41) and $\chi_h$, and $\chi_v$ are respectively, the horizontal and vertical sample correlations, $$\chi_h = \frac{1}{NM}\left(\sum_{i=1}^{N}\sum_{j=1}^{M-1} x_{i,j}x_{i,j+1} + X_{h_1}^b\right) \qquad (49)$$

$$\chi_v = \frac{1}{NM}\left(\sum_{i=1}^{N-1}\sum_{j=1}^{M} x_{i,j}x_{i+1,j} + X_{v_1}^b\right) \qquad (50)$$

with $\chi_h^b$ and $\chi_v^b$ representing correction terms that depend on the choice of boundary conditions.

$$\chi_h^b = \begin{cases} 0 & \text{for Dirichlet fields} \\ \frac{1}{2}\sum_{i=1}^{N}(x_{i,1}^2+x_{i,M}^2) & \text{for variational fields} \\ \sum_{i=1}^{N}(x_{i,1}x_{i,2}+x_{i,M-1}x_{i,M}) & \text{for symmetric fields} \end{cases} \qquad (51)$$

$$\chi_v^b = \begin{cases} 0 & \text{for Dirichlet fields} \\ \frac{1}{2}\sum_{j=1}^{M}(x_{1,j}^2+x_{N,j}^2) & \text{for variational fields} \\ \sum_{j=1}^{M}(x_{1,j}x_{2,j}+x_{N-1,j}x_{N,j}) & \text{for symmetric fields} \end{cases} \qquad (52)$$

The matrices $S_K(K=N, M)$ in (48) depend on the choice of boundary conditions. The eigenvalues of these matrices are computed prior to the conjugate gradient search using the functional forms derived in the aforementioned Technical Report 91-03, for each boundary condition. For example, for zero (free or Dirichlet) boundary condition, the eigenvalues of $S_K$ are given by $$\lambda_k(S_K) = 2\cos\frac{k\pi}{K+1}, 1 \leq k \leq K \qquad (53)$$

The function gradient over the two dimensional space $(\beta_h, \beta_j)$ is $$\nabla L = [\nabla L_{h1}, \nabla L_{v1}] \qquad (54)$$

where $\nabla L_{hi}$, and $\nabla L_{vi}$, the partial derivatives of L(.) with respect to $\beta_{hi}$ and $\beta_{vi}$, respectively, are given by $$\nabla L_{h_1} = \frac{1}{2NM}\sum_{i=1}^{N}\sum_{j=1}^{M}\frac{\lambda_j(S_M)}{(1-\beta_v\lambda_i(S_N)-\beta_h\lambda_j(S_M))} - \frac{\chi_h}{\sigma^2} \qquad (55)$$

$$\nabla L_{v_1} = \frac{1}{2NM}\sum_{i=1}^{N}\sum_{j=1}^{M}\frac{\lambda_j(S_N)}{(1-\beta_v\lambda_i(S_N)-\beta_h\lambda_j(S_M))} - \frac{\chi_v}{\sigma^2} \qquad (56)$$

The conjugate gradient search uses the above expressions for the function and the gradient.

For practical purposes, an approximate parameter estimate may be obtained as discussed below. Further details may be found in Nikhil Balram, *A Recursive Framework for Noncausal Gauss Markov Random Fields*, PhD thesis, Carnegie Mellon University, Pittsburgh, Pa., January 1992, Chapter 6, the entire thesis being hereby incorporated by reference.

Approximation: For many images, the first order GMRF with zero boundary conditions performs satisfactorily, as for example in the experiment presented below. For square (i.e., N=M) images that are locally smooth, there is a simple approximate relationship that provides directly an approximate minimum point at which the function is within a few percent of its minimum value, without requiring an iterative search of the parameter space.

The parameter space is defined by the inequality $$|\beta_v| + |\beta_h| < \frac{1}{2\cos\frac{\pi}{M+1}} \qquad (57)$$

but for numerical stability we use a tolerance $\kappa$ on the right hand side, $$\zeta = \frac{1}{2\cos\frac{\pi}{M+1}} - \kappa. \qquad (58)$$

Defining the function sign (.) as $$\text{sign}(y) = \begin{cases} -1 & \text{if } y < 0 \\ +1 & \text{if } y > 0 \end{cases} \qquad (59)$$

the approximate parameter estimates are given by $$\beta_h = \frac{\zeta\text{sign}(X_h)|X_h|}{|X_h|+|X_u|}, \qquad (60)$$

$$\beta_u = \frac{\zeta\text{sign}(X_u)|X_u|}{|X_h|+|X_u|}. \qquad (61)$$

Figure 7:
FIGS. 7 and 8 illustrate the results achieved using two prior art techniques.

That relationship is derived from the intuitively appealing notion that the ratio of the interaction coefficients should be equal to the ratio of the sample correlations, and the fact that for fields that are smooth (as most images are) the minimum lies very close to the parameter space boundary. We used this approximation to derive the parameters for the first order model used for the image shown in FIG. 7 discussed below.

3. Codec

The codec is described in detail below using the equations summarized in the previous section. The codec is structured as shown in FIG. 2 for the coder 10 and FIG. 4 for the decoder. The coder is described in subsection 3.1 and the decoder in subsection 3.2. Some of the specialized tasks in the coder and decoder are described through the input output specifications of blocks corresponding to subroutines in a programming language. The structure of these blocks is explained in subsection 3.3. The dependence of the codec on the specific model order chosen is expressed inside these blocks. At the block level in subsections 3.1 and 3.2, the procedure is independent of the specific model order. Note that for third and higher order models, the lattice is repartitioned, as discussed above in which case N and M are the row and column sizes of the repartitioned image.

The user is required to specify three tolerance values for the program. For the parameter estimation, tolerances $\kappa$ and $\epsilon$ are needed. The former is used in bracketing for first order fields only, representing the minimum distance from the parameter space boundary that is acceptable from the point of view of numerical stability. The latter is used in the stopping condition for the iterative search of the parameter space. Typical values are $10^{-3}$ to $10^{-6}$ depending upon computer budget and the desired quality of the reconstructed image.

For the Riccati iteration in subroutine riccati(.), tolerance $\delta$ is used as the stopping criterion for convergence of the iteration. As we shall see below, all three tolerances are used in the coder but only the last one mentioned above, $\delta$, is used in the decoder (since it has no parameter estimation stage).

3.1 Coder

The coder takes the given image X as input and produces a compressed representation $W_q$ plus some overhead information (m,$\theta$) pertaining to the image model.

Stage 11—Subtract Global Mean

The global mean m of the image is computed and subtracted out, and the noncausal model parameters 8 are estimated using the zero mean image.

(a) Compute global image mean m, (a) Compute global image mean m, $$m = \frac{1}{NM} \sum_{i=1}^{N} \sum_{j=1}^{M} x_{i,j}.$$

(b) Subtract global mean from image, $$X := X - m$$

(c) Compute sample power $S_\chi$ using (41), and sample correlations $\{X_\tau, \tau\eta_p\}$ using (42) for arbitrary order models or (49)–(52) for first order.

Stage 12—Identify Noncausal Parameters

The parameter space of $\theta$ is searched iteratively along a sequence of conjugate line directions ($D^{(i)}$) chosen according to a conjugate gradient method such as the Polak-Ribiere conjugate gradient method[7]. When using a first model with zero (also known as free or Dirichlet) boundary conditions, for practical reasons the iterative search may be replaced by the fast approximation outlined in section 2. In that case, the iterative search is replaced by the subroutine approxest(.) which is given in subsection 3.3.

[7] W. H. Press, B. P. Flannery, S. A. Teukolsky, and W. T. Vetterling, Numerical Recipes in C, *The Art of Scientific Computing*, Cambridge University Press, Cambridge, Mass., 1989.

Each iteration i finds the point $\theta^{(i+1)}$ at which the (negative log) likelihood function L(.) is minimized on the line specified by the previous minimum point $\theta^{(i)}$ and conjugate direction $D^{(i)}$. The iteration proceeds until the change in function value between two consecutive minimum points is below a user specified tolerance $\epsilon$.

(a) Initialization: Choose search tolerance $\epsilon$, the starting point $\theta^{(0)}$ (we use the origin), and the initial direction $D^{(0)}$ (we use the negative gradient as suggested in the Polak-Ribere method), $$\theta^{(0)} := 0$$

$$\gamma_o := 0$$

$$i := 0$$

$$D^{(0)} := -\nabla L(\theta^{(0)}),$$

where $\nabla L(.)$, the gradient of L(.), is computed by the subroutine funcgradient(.).

(b) Line minimizations: The program iterates through line minimizations until the stop condition below is satisfied. The minimization along line i specified by the point and direction pair ($\theta^{(i)}$, $D^{(i)}$) proceeds as follows:

i. The line minimum is bracketed by finding scalars a, b, c such that a<b<c and $$L(\theta^{(i)}+bD^{(i)}) < \min(L(\theta^{(i)}+aD^{(i)}), L(\theta^{(i)}+cD^{(i)})).$$

The bracketing is done by subroutine bracket (.). The value of L(.) at any location in the parameter space is provided by subroutine funcvalue (.)

ii. Given bracket points a, b, c, subroutine dbrent(.) uses parabolic interpolation (Brent's method), to find the scalar $\alpha_{min}$ that minimizes the value of the function along line i, i.e., $$\alpha_{min} = \arg_\alpha{}^{min} L(\theta^{(i)}+\alpha D^{(i)}).$$

iii. The present value of the minimum point is updated:

$$\theta^{(i+1)} := \theta^{(i)} + \alpha_{min} D^{(i)}.$$

(c) Stop condition: The function value at the latest update of the minimum ($\theta^{(i+1)}$) is compared with that at the previous estimate of the minimum ($\theta^{(i)}$). If the change in the function value is below the user specified tolerance $\epsilon$ the parameter estimation is terminated, otherwise the new conjugate direction is chosen according to Polak-Ribiere's update formula.

If $$\frac{2|L(\theta^{(i+1)}) - L(\theta^{(i)})|}{|L(\theta^{(i+1)})| + |L(\theta^{(i)})|} > \epsilon$$

then $$\gamma_i = \frac{(\nabla L(\theta^{(i+1)}) - \nabla L(\theta^{(i)}))^T \nabla L(\theta^{(i+1)})}{\nabla L(\theta^{(i)})^T \nabla L(\theta^{(i)})}$$

$$D^{(i+1)} := -\nabla L(\theta^{(i+1)}) + \gamma_i D^{(i)}$$

$$i := i + 1$$

Go to beginning of line minimization else $$\hat{\theta}_{ML} := \theta^{(i)}$$

Exit the iteration.

Stage 14—Transformation

Given the noncausal model parameter estimate vector $\hat{\theta}_{ML}$ (which is the output of the previous stage), the subroutine riccati(.) computes the equivalent recursive representation matrices $\{U_i, \Theta_i\}$.

Stage 16—Compute Error Field

The uncorrelated error image W is generated recursively one row at a time, starting with the last (Nth) row, using the equivalent "backward" autoregressive row process (11). The equivalent recursive matrices $\{U_i, \Theta_i\}$ were computed in the previous stage.

Stage 18—Quantization/Coding

Any quantizer may be used to quantize the error image (W). In our experiments, we use a Vector Quantizer (VQ) with the known LBG algorithm to obtain bit rates of 0.5 and lower (corresponding to compression ratios of 16 or better). The quantizer output is entropy coded to obtain additional lossless compression. The output of this stage is the quantized and entropy coded field $W_q$.

The output of the coder (10) is a compressed representation of the image that consists of the quantized and entropy coded error field $W_q$, with the noncausal model parameters ($\theta$,m) as overhead information required by the decoder. This overhead is negligible in comparison with the quantized error image, for example, for a first order model, there are only three scalar overhead items, the parameters $\beta_h$ and $\beta_v$, and the mean m. The error field and the noncausal model parameters may be transmitted using any appropriate transmission means to the decoder 20. Alternatively, that information could be sent to a storage medium where it is held until the image is requested. After the image is requested, that information would be routed to the decoder.

3.2 Decoder

Figure 4:
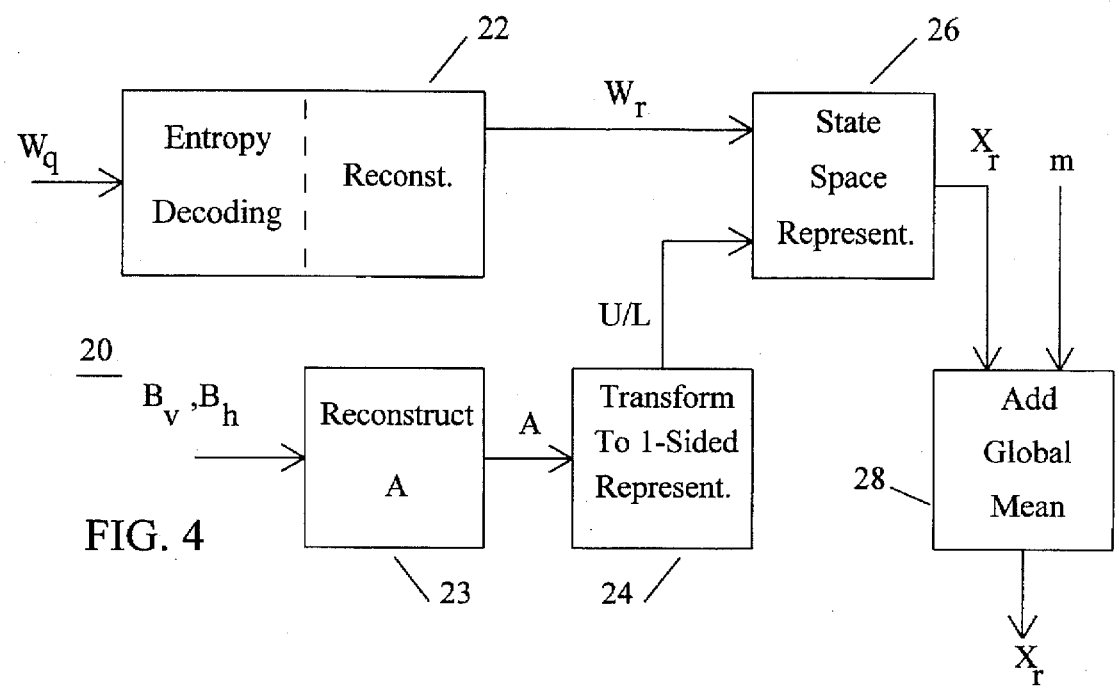
FIG. 4 is a block diagram illustrating the steps of the decoder of the present invention.

The decoder (20) provides a reconstructed version of the image ($X_r$) from the coded error image $W_q$ and the model parameters ($\theta$, m). Except for parameter estimation stage (12) in the coder (10), the decoder (20) stages are essentially the reverse of the coder (10). Refer to FIG. 4 for the block diagram of the decoder (20).

In stage 22, the coded error image $W_q$ is entropy decoded and reconstructed according to the rules of the quantizer, producing the reconstructed error image $W_{q'}$. In stage 23, the potential matrix A is generated from the noncausal model parameters. In Stage 24, given the noncausal model parameter vector $\theta$, the subroutine riccati(.) computes the equivalent recursive representation matrices $\{U_i, \Theta_i\}$. Thus, in stage 24, the potential matrix is converted to an equivalent one-sided representation.

The "backward" state space model (12) is used in stage 26 to reconstruct the image recursively, one row at a time, starting from the last (Nth) row, with the rows from the reconstructed error image $W_r$ as inputs. The state space matrices $\{G_i^b, F_i^b\}$ are obtained from $\{U_i, \Theta_i\}$ using (17) and (18).

The global mean m is added to the reconstructed image, at stage 28:

$$x_r := x_r + m.$$

3.3 Subroutines

The following subroutines (blocks) were used in the coder (10) and decoder (20): riccati(.), funcvalue(.), funcgradient (.), bracket(.), dbrent(.), and approxest(.). These are discussed below. For some of the subroutines, the procedure is different for models for which the eignevalues of the potential matrix $A_p$ are known (first order and special second order models), from the general case of the arbitrary order model with the eigenstructure of $A_p$ being unavailable. In the former case, explicit expressions are available for the evaluation of the likelihood function and its gradient, in, respectively, funcvalue(.), and funcgradient(.), and an exact description of the parameter space is available for use in the bracketing routine, bracket(.). We describe here the procedure for first order models, as well as the one for arbitrary order.

The procedure for the special second order model is identical to the one for first order, with substitution of the appropriate equations given in A Recursive Framework for Noncausal Gauss Morkov Rondom Fields (the above-cited Phd thesis) in place of the corresponding ones for the first order case. A specific user specified parameter can be used to switch between the different procedures in each block, or the choice of model and the resulting procedures could be fixed a priori, for example in hardware implementation.

1. riccati(.)

Inputs: $\theta$, $\delta$

Outputs: $n_\delta$, $\{U_i\}_{i=1}^{n_\delta}$, $\{\Theta_i\}_{i=1}^{n_\delta}$ (optional, see comments below).

Procedure:

Blocks B and C in the potential matrix A given in (5) are set up using the parameter vector $\theta$. The structure of B and C is dependent on the model order and boundary conditions.

The Riccati interaction in (21) is continued until convergence to specific tolerance $\delta$. One possible metric for convergence using the easily computed matrix infinity norm $\|\cdot\|_\infty$ is $$\|S_{i-1} - S_i\|_\infty \leq \delta, \tag{62}$$

i.e., convergence is said to have occurred at iteration $i=n\delta$, when the condition in (62) is satisfied. Due to the geometric rate of convergence, this occurs after only a small number of iterations and in most cases $$n_\delta \ll N.$$

After each iteration i, the diagonal elements of $S_i$ are tested for positivity. If any of these elements are negative or zero (indicating that the parameters are outside the valid parameter space of the model), the boolean variable "valid" is set to zero, and the iteration is aborted.

The Cholesky factor matrices $\{U_i, \Theta_i\}_{i=1}^{n_\delta}$ are computed using (22) and (23).

The number of iterations until convergence, $n\delta$, and the matrices $\{U_i\}_{i=1}^{n_\delta}$ are the output of this block. The set $\{\Theta_i\}_{i=1}^{n_\delta}$ may be returned as output or computed elsewhere, when required, from (23), depending on whether computational cost or memory usage is the primary constraint of the implementation.

2. funcvalue(.)

Inputs: $\theta^{(i)}$, $D^{(i)}$, $\alpha$, $s_\chi$, $\{\chi_\tau \in \eta_p\}$, $\{\lambda_k(S_k)\}$.

Outputs: valid (boolean), $L(\theta^{(i)} + \alpha D^{(i)})$.

Procedure for first order fields: The (negative log) likelihood function is evaluated at the given location ($\theta^{(i)} + \alpha D^{(i)}$) using the expression given in (48), with $\sigma^2$ substituted from (43).

Procedure for arbitrary order fields: The function is evaluated at the given location ($\theta^{(i)} + \alpha D^{(i)}$) using the expression in (40), with $\sigma^2$ substituted from (43). The subroutine riccati(.) is used to compute the blocks $U_i$ up to convergence with tolerance For convergence at $n\delta$ (see procedure for riccati (.)), the function value is given by $$L(\theta, \sigma^2) = \frac{1}{2} \ln \sigma^2 - \frac{1}{NM} \left[ \sum_i^{n_\delta} \ln|U_i| + (N - n_\delta) \ln|U_{n_\delta}| \right] + \frac{1}{2\sigma^2} \left[ S_x - 2 \sum_{\tau \in \eta_p} \beta_\tau X_\tau \right], \tag{63}$$

with $\sigma^2$ substituted from (43). If riccati(.) returns valid=0, exit the procedure with valid=0.

3. funcgradient(.)

Inputs: $\theta^{(i)}$, $D^{(i)}$, $\alpha$, $S_\chi$, $\{\chi_\tau \in \eta_p\}$, $\{\lambda_k(S_K)\}$.

Outputs: $\nabla L(\theta^{(i)} + \alpha D^{(i)})$.

Procedure for first order fields: The gradient is evaluated at the given location ($\theta^{(i)} + \alpha D^{(i)}$) using the expressions given in (54)–(56) with $\sigma^2$ substituted from (43).

Procedure for arbitrary order fields: The gradient is evaluated at the given location ($\theta^{(i)} + \alpha D^{(i)}$) using the expressions given in (44) and (45), with $\sigma^2$ substituted from (43). The statistical quantities in (45) ($E\{X_\tau\}$) are estimated from samples of a GMRF with parameter vector $\theta=\theta^{(i)}+\alpha D^{(i)}$. These samples are synthesized using the recursive representation of the GMRF. The procedure is as follows:

1. Given the noncausal model parameter vector $\theta$, the subroutine riccati(.) computes the equivalent recursive representation matrices $\{U_i, \Theta_i\}$.

2. The ("backward") state space representation (64) is used to generate recursively (one row at a time) K samples of the field, with a Gaussian random number generator providing the white noise input:

For k=1 to K $$\vec{\chi}_N^{(k)}=G_N{}^b\vec{\omega}_N^{(k)},\ \vec{\chi}_i^{(k)}=F_i{}^b\vec{\chi}_{i+1}^{(k)}+G_i{}^b\vec{\omega}_i^{(k)},\ 1\leq i\leq N-1, \quad (64)$$

with model matrices defined in (17) and (18). The sample correlation $X_\tau^{(k)}$ is computed for sample #K.

Step 3: The sample correlations $\{X_\tau^{(k)}\}_{K=1}{}^K$ are substituted into (46) and the results into (45), to obtain an estimate for the gradient at the given point.

4. bracket(.)
Inputs: $\theta^{(i)}$, $D^{(i)}$, $\alpha$, $S_\chi$, $\{\chi_\tau \epsilon \eta_p\}$, $\{\lambda_K(S_K)\}$, funcvalue(.)
Outputs: a, b, c
Procedure for first order fields:

1. a:=0.

2. Set c equal to the smallest positive constant k such that the point $\theta^{(i)}+kD^{(i)}$ lies inside the valid parameter space. Illustrating for example, with the first order model with zero boundary conditions and a square image N=M. The valid parameter space for this model is given by (57). For numerical stability we use a boundary cushion (since the model matrix A is undefined on the boundary), using (58) on the right hand side of (57) and an equality instead of the inequality. For k=k1, k2, k3, k4, the point $\theta^{(i)}+kD^{(i)}$ is placed on one of the four boundary lines given by (57) (with (58) as the right hand side), and c:=min (k1>0, i=1, 2, 3, 4).

3. If $$L(\theta^{(i)}+\alpha D^{(i)})>L(\theta^{(i)}+cD^{(i)})$$

then
Swap a and c

4. Repeat until exit condition is satisfied:

$$b=\frac{a+c}{2}$$

IF $$L(\theta^{(i)}+bD^{(i)})<\min(L(\theta^{(i)}+\alpha D^{(i)}),L(\theta^{(i)}+cD^{(i)}))$$

then
Exit
else
c:=b
Go back to beginning of loop
Procedure for arbitrary order fields:

1. a:=0

2. Find middle point: starting with a large initial value for b, evaluate function at b using funcvalue(.), continue to decrease b (e.g., b:=b/2) until a valid point is obtained.

3. Find outer point: starting at b step along line away from a and evaluate function. Repeat with decreasing step sizes until a valid point c is found at which the function value is larger than at b.

5. dbrent(.)
Inputs: $\theta^{(i)}$, $D^{(i)}$, a, b, c, funcvalue(.), funcgradient(.)
Outputs: $\alpha_{min}$
Procedure: This subroutine uses Brent's method for parabolic interpolation to obtain the minimum along a line. The procedure begins with three points that bracket the line minimum. We obtained the routine from W. H. Press, B. P. Flannery, S. A. Teukolsky, and W. T. Vetterling. Numerical Recipes in C, *The Art of Scientific Computing*. Cambridge University Press, Cambridge, Mass., 1989.

6. approxest(.)
Inputs: $\chi_h$, $\chi_v$, $\kappa$.
Outputs: $\theta=[\beta_h, \beta_v]$
Procedure: Compute approximate estimates $\beta_h$ and $\beta_v$ using respectively, (60) and (61).

4. Experimental Results

Figure 5:
FIG. 5 illustrates an image to be compressed and then reproduced from the compressed data.
Figure 6:
FIG. 6 illustrates experimental results achieved with the present invention.
Figure 8:

The performance of the present invention is highlighted by an experiment comparing the results obtained using our approach versus the worldwide standard proposed by the Joint Photographic Experts Group (JPEG)) for still image compression based on the Discrete Cosine Transform (DCT) [8]. The original image we use is the 128×128 portion of the Lenna image from the USC database,[9] see FIG. 5. The reconstructed image after compression to 0.375 bits per pixel (a compression ratio of 21.3) produced by our algorithm using a Vector Quantizer with 4×4 blocks and 64 code vectors to quantize the error field is displayed in FIG. 6. For the purposes of comparison, the results obtained when the Vector Quantizer is used directly on the image is provided in FIG. 7. The baseline JPEG coding software (using 8×8 DCT blocks)[10] was used to produce an image with approximately the same compression ratio which is presented in FIG. 8. Comparing FIG. 8 with FIG. 6, it is clear that our algorithm produces much better visual quality than the JPEG procedure.

[8] G. K. Wallace. The JPEG still picture compression standard. *Comm of ACM*, 34(4):31–44, 1991.
[9] USC-SIPS image data base. Signal and Image Processing Institute, University of Southern California, Los Angeles, Calif.
[10] M. R. Souryal. The CCIT H.261 video coding algorithm: Evaluation of implementation options. Master's theses, Information Networking Institute, Carnegie Mellon University, Pittsburgh, Pa., October 1991.

5. Conclusions

The codec of the present invention for still image compression outlined in section 3 is a new approach that has been experimentally shown to produce significantly better results than the present standard. Although the present invention has been described in terms of a preferred embodiment, those of ordinary skill in the art will recognize that modification and variations are possible. This disclosure and the following claims are intended to cover all such modifications and variations.

What we claim is:

1. A method of converting a noncausal, two dimensional signal representative of a digitized image into a statistically equivalent recursive model for use in processing the digital image, comprising the steps of:

(i) digitizing an image to produce a two dimensional signal;

(ii) filtering the two dimensional signal to arrive at data representative of an optimal set of parameters of the two dimensional signal by:

a. generating data representative of a potential matrix which represents the two dimensional signal for a given set of parameters;

b. filtering said potential matrix data to arrive at a statistically equivalent recursive model through a Cholesky factorization of said potential matrix data for said given set of parameters using a Riccati iteration filtering technique;

c. inputting white noise to said equivalent recursive model to generate k samples of the two dimensional signal;

d. obtaining an average value for $\chi_\tau^{(k)}$ where $\chi_\tau^{(k)}$ is data representative of a correlation of lag $\tau$ computed from sample k;

e. generating data representative of a gradient of a likelihood function by solving $$\nabla L = [\nabla L_\tau : \tau \in \eta_\rho] \text{ where}$$

$$\nabla L_\tau = \frac{\hat{E}\{\chi_\tau\} - \chi_\tau}{\sigma^2} \text{ and}$$

$\hat{E}\{\chi_\tau\}$ is the average value of $[\chi_\tau i]$ said correlation data;

f. minimizing data representative of said likelihood function utilizing said data representative of said gradient of said likelihood function to arrive at a set of parameters;

g. comparing said arrived at set of parameters to a previously arrived at set of parameters to determine whether the difference therebetween is within a desired tolerance; and h. repeating steps (a) through (g) until said data representative of said optimal set of parameters is determined;

(iii) generating data representative of a potential matrix which represents the two dimensional signal for said data representative of said optimal set of parameters;

(iv) filtering said potential matrix data to arrive at a statistically equivalent recursive model through said Cholesky factorization of said potential matrix data for said data representative of said optimal set of parameters using said Riccati iteration filtering technique; and (v) processing the two dimensional signal using said recursive model.

2. The method of claim 1 wherein said step of minimizing said data representative of said likelihood function includes the step of minimizing said data representative of said likelihood function utilizing data representative of a conjugate gradient of said likelihood function.

3. The method of claim 2 wherein said step of minimizing said data representative of said likelihood function includes the step of minimizing said data representative of said likelihood function along a line using line minimization techniques.

4. The method of claim 3 wherein said step of minimizing said data representative of said likelihood function includes the step of minimizing said data representative of said likelihood function utilizing the following equation:

$$L(\theta,\sigma^2) = \frac{1}{2} \ln\sigma^2 - \frac{1}{NM} \sum_i^N \ln|U_i| + \frac{1}{2\sigma^2}\left[S_x - 2\sum_{\tau \in \eta\rho} \beta_\tau X_\tau\right],$$

5. A method of converting a noncausal, two dimensional signal representative of a digitized image expressed as a first order Gauss Markov random field (GMRF) into a statistically equivalent recursive model for use in processing the digitized image, comprising the steps of:

(i) digitizing an image to produce a two dimensional signal;

(ii) filtering the two dimensional signal to arrive at data representative of an optimal set of parameters of the two dimensional signal by:

a. generating data representative of a gradient of a likelihood function by solving $$\nabla L_{h1} = \frac{1}{2NM} \sum_{i=1}^N \sum_{j=1}^M \frac{\lambda_j(S_M)}{(1-\beta_v\lambda_i(S_N)-\beta_h\lambda_j(S_M))} - \frac{X_h}{\sigma^2}$$

$$\nabla L_{v1} = \frac{1}{2NM} \sum_{i=1}^N \sum_{j=1}^M \frac{\lambda_j(S_M)}{(1-\beta_v\lambda_i(S_N)-\beta_h\lambda_j(S_M))} - \frac{X_v}{\sigma^2}$$

b. minimizing data representative of said likelihood function utilizing said data representative of said gradient of said likelihood function to arrive at a set of parameters;

c. comparing said arrived at set of parameters to a previously arrived at set of parameters to determine whether the difference therebetween is within a desired tolerance; and d. repeating steps (a) through (c) until said data representative of said optimal set of parameters is determined;

(iii) generating data representative of a potential matrix which represents the two dimensional signal for said data representative of said optimal set of parameters; and (iv) filtering said potential matrix data to arrive at a statistically equivalent recursive model through a Cholesky factorization of said potential matrix data for said data representative of said optimal set of parameters using a Riccati iteration filtering technique and (v) processing the two dimensional signal using said recursive model.

6. A method of converting a noncausal, two dimensional signal representative of a digitized image expressed as a first order Gauss Markov random field (GMRF) with zero boundary conditions into a statistically equivalent recursive model for use in processing the digitized image, comprising the steps of:

(i) digitizing an image to produce a two dimensional signal;

(ii) filtering the two dimensional signal to arrive at data representative of an optimal set of parameters of the two dimensional signal by solving the following equations:

$$\beta_h = \frac{\zeta sign(X_h)|X_h|}{|X_h| + |X_v|},$$

$$\beta_v = \frac{\zeta sign(X_v)|X_v|}{|X_h| + |X_v|}.$$

(iii) generating data representative of a potential matrix which represents the two dimensional signal for said data representative of said optimal set of parameters; and (iv) filtering said potential matrix data to arrive at a statistically equivalent recursive model through a Cholesky factorization of said potential matrix data for said data representative of said optimal set of parameters using a Riccati iteration filtering technique; and (v) processing the two dimensional signal using said recursive model.

7. A method of compressing a signal representative of a digital image, comprising the steps of:

(i) digitizing an image to produce a digital image signal (ii) filtering the digital image signal to arrive at data representative of an optimal set of parameters of the digital image signal by:

a. generating data representative of a potential matrix which represents the digital image signal for a given set of parameters;
b. filtering said potential matrix data to arrive at a statistically equivalent recursive model through a Cholesky factorization of said potential matrix data for said given set of parameters using a Riccati iteration filtering technique;
c. inputting white noise to said equivalent recursive model to generate k samples of the digital image signal;
d. obtaining an average value for $\chi_\tau^{(k)}$ where $\chi^{(k)}_\tau$ is data representative of a correlation of lag $\tau$ computed from sample k;
e. generating data representative of a gradient of a likelihood function by solving $$\nabla L = [\nabla L_\tau \colon \tau \in \eta_\rho] \text{ where}$$

$$\nabla L_\tau = \frac{\hat{E}\{\chi_\tau\} - \chi_\tau}{\sigma^2} \text{ and}$$

$\hat{E}\{\chi_\tau\}$ is the average value of $[\chi_\tau i]$ said correlation data;

f. minimizing data representative of said likelihood function utilizing said data representative of said gradient of said likelihood function to arrive at a set of parameters;
g. comparing said arrived at set of parameters to a previously arrived at set of parameters to determine whether the difference therebetween is within a desired tolerance; and
h. repeating steps (a) through (g) until said data representative of said optimal set of parameters is determined;

(iii) generating data representative of a potential matrix which represents the digital image signal for said data representative of said optimal set of parameters;

(iv) filtering said potential matrix data to arrive at a statistically equivalent recursive model through said Cholesky factorization of said potential matrix data for said data representative of said optimal set of parameters using said Riccati iteration filtering technique; and (v) compressing said digital image signal by comparing said statistically equivalent recursive model for said data representative of said optimal set of parameters to the digital image signal to establish an error image signal, said error image signal and said optimal set of parameters being an equivalent of the digital image signal but requiring fewer bits than the digital image signal for the same level of perceived quality.

8. The method of claim 7 additionally comprising the steps of quantizing and entropy coding said error image signal.

9. The method of claim 8 additionally comprising the preprocessing step of subtracting a global mean signal from the digital image signal prior to said step of filtering the digital image signal to arrive at said data representative of said optimal set of parameters of the digital image signal.

10. The method of claim 7 additionally comprising the step of transmitting said error image signal and said data representative of said optimal set of parameters to a decoder.

11. The method of claim 7 additionally comprising the step of storing said error image signal and said data representative of said optimal set of parameters.

12. The method of claim 7 additionally comprising the steps of:

(i) generating data representative of a potential matrix which represents the digital image signal from said data representative of said optimal set of parameters;

(ii) filtering said potential matrix data to arrive at a statistically equivalent recursive model through said Cholesky factorization of said potential matrix data for said data representative of said optimal set of parameters using said Riccati iteration filtering technique; and (iii) applying said statistically equivalent recursive model to said error image signal to reconstruct the digital image signal.

13. A method of smoothing a signal representative of a distorted digital image, comprising the steps of:

(i) digitizing an image to produce a digital image signal;

(ii) filtering the digital image signal to arrive at data representative of an optimal set of parameters of the digital image signal by:

a. generating data representative of a potential matrix which represents the digital image signal for a given set of parameters;
b. filtering said potential matrix data to arrive at a statistically equivalent recursive model through a Cholesky factorization of said potential matrix data for said given set of parameters using a Riccati iteration filtering technique;
c. inputting white noise to said equivalent recursive model to generate k samples of the digital image signal;
d. obtaining an average value for $\chi_\tau^{(k)}$ where $\chi^{(k)}_\tau$ is data representative of a correlation of lag $\tau$ computed from sample k;
e. generating data representative of a gradient of a likelihood function by solving $$\nabla L = [\nabla L_\tau \colon \tau \in \eta_\rho] \text{ where}$$

$$\nabla L_\tau = \frac{\hat{E}\{\chi_\tau\} - \chi_\tau}{\sigma^2} \text{ and}$$

$\hat{E}\{\chi_\tau\}$ is the average value of $[\chi_\tau i]$ said correlation data;

f. minimizing data representative of said likelihood function utilizing said data representative of said gradient of said likelihood function to arrive at a set of parameters;
g. comparing said arrived at set of parameters to a previously arrived at set of parameters to determine whether the difference therebetween is within a desired tolerance; and
h. repeating steps (a) through (g) until said data representative of said optimal set of parameters is determined;

(iii) generating data representative of a potential matrix which represents the digital image signal for said data representative of said optimal set of parameters;

(iv) filtering said potential matrix data to arrive at a statistically equivalent recursive model through said Cholesky factorization of said potential matrix data for said data representative of said optimal set of parameters using said Riccati iteration filtering technique;

(v) subjecting said statistically equivalent recursive model to a recursive smoothing technique; and (vi) producing a signal representative of an enhanced digital image from said model.

* * * * *